(12) United States Patent
Gollamudi et al.

(10) Patent No.: US 7,693,099 B2
(45) Date of Patent: Apr. 6, 2010

(54) METHODS OF WIRELESS COMMUNICATION

(75) Inventors: Sridhar Gollamudi, Morris Plains, NJ (US); Shirish Nagaraj, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1059 days.

(21) Appl. No.: 10/853,362

(22) Filed: May 26, 2004

(65) Prior Publication Data

US 2005/0265250 A1    Dec. 1, 2005

(51) Int. Cl.
*H04W 4/00* (2006.01)

(52) U.S. Cl. ..................................... 370/328

(58) Field of Classification Search .................. None
See application file for complete search history.

(56) References Cited

U.S. PATENT DOCUMENTS

| 6,901,063 | B2* | 5/2005 | Vayanos et al. ............. 370/335 |
|---|---|---|---|
| 7,069,038 | B2* | 6/2006 | Hakkinen et al. ............ 370/332 |
| 7,143,330 | B2* | 11/2006 | Ahn et al. ..................... 714/748 |
| 7,158,802 | B2* | 1/2007 | Dick et al. .................... 455/509 |
| 7,453,821 | B2* | 11/2008 | Nagaraj ....................... 370/252 |
| 2003/0099211 | A1* | 5/2003 | Moulsley et al. ............ 370/328 |
| 2004/0219917 | A1* | 11/2004 | Love et al. ................... 455/436 |
| 2005/0013263 | A1* | 1/2005 | Kim et al. .................... 370/320 |
| 2005/0042985 | A1* | 2/2005 | Cheng et al. .................. 455/24 |
| 2005/0265249 | A1* | 12/2005 | Nagaraj ....................... 370/252 |
| 2006/0045010 | A1* | 3/2006 | Baker et al. ................. 370/230 |

* cited by examiner

*Primary Examiner*—Anh-Vu Ly
(74) *Attorney, Agent, or Firm*—Harness, Dickey & Pierce (57) ABSTRACT

In a method of wireless communication, signaling information in a received signal may be detected using a detection parameter. The detection parameter may be determined based on at least one of a probability of false alarm and a target probability of false alarm. Another method may detect signaling information using an estimated transmission probability value for a subsequent time instant that is determined based on an estimated transmission probability value for a current time instant. The detection parameter may also be determined from the estimated probability of transmission values.

18 Claims, 5 Drawing Sheets

METHODS OF WIRELESS COMMUNICATION

BACKGROUND OF THE INVENTION

1. Field of the Invention

The present invention is related, in general, to methods of wireless communication.

2. Description of the Related Art

An innovative aspect in third generation (3G) wireless communication systems is the offering of high-speed packet data services to end users. The Universal Mobile Telecommunications System (UMTS) may provide improved voice capacity as compared to earlier systems. However, the bulk of the innovation may lie in the ability of UMTS to provide a "fat pipe", or a shared channel, where packet data users are served with time-sharing or scheduling based on knowledge of their instantaneous channel quality. In UMTS, this channel is generally referred to as a high-speed downlink packet access (HSPDA) channel.

A wireless channel is inherently different from a wire line channel, in that a wireless channel is dynamic and has a time-varying capacity to carry information. Higher layer protocols such as transmission control protocol (TCP) have been designed based on a premise that the links are constant capacity links and any failure to get a packet across is most likely due to congestion in the network elements. This assumption is not true for transmission over a single wireless link. Diversity, i.e., when the same signal arrives at the destination via multi independent paths, plays a role in wireless channel reliability. The diversity paths may be obtained in space (by multiple transmit or receive antennas) and/or in frequency (by resolving multiple propagation paths at different delays), and/or in time (by transmitting the same information over multiple blocks of time).

Spatial diversity requires the setting up and utilizing of additional antenna elements in the infrastructure and/or the mobile station, and multi-path diversity is a function of the propagation environment. On the other hand, utilization of time diversity may enable reliable packet data transmission in the packet data network when the last link is a wireless channel. This type of transmission may be achieved via what is referred to as Hybrid Automatic Repeat reQuest (HARQ). In a HARQ transmission, the same information is re-transmitted with a possibly different code, if one or more of the previous transmissions have failed. However, stabilizing effects of HARQ for improving link reliability may come at the cost of increased delay.

To enable a HARQ transmission, a reverse link channel (mobile to base station) should be available, which can signal, to the base station transmitter, if the particular transmission has been successful or not. This uplink channel should be designed to carry a signaling message containing a positive acknowledgement (ACK), or a negative acknowledgement (NACK), and/or not transmit anything (known as discontinuous transmission (DTX) frame, a frame with no data in it) when there is no packet to acknowledge. This signaling channel is known as the high-speed dedicated physical control channel (HS-DPCCH) in UMTS. The downlink (base station to mobile) capacity of a data channel such as HSDPA depends on the ability of the uplink receiver at the base station, to correctly detect these ACK/NACK/DTX signals. When a particular user is not scheduled by the base station (also known as the NodeB) transmitter, the ACK/NACK detector at the NodeB can know that and may expect a DTX (silence).

On the other hand, when the user has been scheduled, all three states (ACK/NACK/DTX) are possible. Although an ACK or NACK may be expected, a DTX may also be possible if the user did not decode that the downlink HSDPA transmission was intended for it. The downlink channel that carries the information as to whether a user is scheduled is known as a high-speed shared control channel (HS-SCCH). Thus, if the mobile (also known as a user equipment (UE)) misses decoding the HS-SCCH when it was actually being transmitted to it, the UE will not transmit anything (no message) on the HS-DPCCH signaling channel, even though the NodeB transmitter is expecting either an ACK bit or a NACK bit in the signaling message carried on the HS-DPCCH.

SUMMARY OF THE INVENTION

An exemplary embodiment of the present invention is directed to a method of wireless communication, in which signaling information in a received signal may be detected using a detection parameter. The detection parameter may be determined based on at least one of a probability of false alarm and a target probability of false alarm.

Another exemplary embodiment of the present invention is directed to a method of wireless communication, in which signaling information may be detected using an estimated transmission probability value for a subsequent time instant. The estimated transmission probability value for the subsequent time instant may be determined based on an estimated transmission probability value for a current time instant.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art. For example, it will be understood that the present invention finds application to any medium access control protocol with multiple modes in other spread spectrum systems such as CDMA2000 systems, other 3G systems and/or potentially developing fourth generation (4G) wireless communication systems.

Where used below, base transceiver station (BTS) and NodeB are synonymous and may describe equipment that provides data connectivity between a wireless network and one or more mobile stations. Additionally where used below, the terms user, user equipment (UE), subscriber, mobile station and remote station are synonymous and describe a remote user of wireless resources in a wireless communication network.

In order to provide context for describing the exemplary embodiments in accordance with the present invention, the inventors describe a generic signal model, detection statistic and performance metrics related to the conventional detection scheme for ACK/NACK detection adopted by the Working Group 4 (WG4) of the UMTS standards body.

Signal Model

The HS-DPCCH channel may be used to carry ACK/NACK signaling information, as well as channel quality measurements (CQI). The HS-DPCCH may be code-multiplexed with the regular dedicated physical channel (DPCH) on the uplink. The HS-DPCCH channel may be placed on the in-phase (I) or the quardrature (Q) transmit branch, depending on whether the number of DPDCHs is even or odd. Since the transmission time interval (TTI) for a HSDPA downlink packet is 2 ms, which corresponds to three (3) slots, the ACK/NACK bit in the signaling message carried on the HS-DPCCH may be carried in the beginning of every third slot. The next two slots may be allocated for the CQI transmission.

The coding for the ACK/NACK bit may be a simple repetition code. For example, one bit gets mapped to N=10 symbols (N representing the number of symbols per slot of the TTI of the DPCCH), with binary phased-shift keying (BPSK) modulation. The ACK bit may be transmitted with the power of $P_A$, and may be pegged relative to the DPCCH. The power on the NACK may be referred to as $P_N$.

For the exemplary signal model, the transmission channel may be a wireless channel with L multiple paths. Any spatial received diversity may be due to additional antennas to be encompassed as modeling additional multipaths. A received signal, ($y_l(n)$), after de-spreading and de-scrambling for finger l (where the HS-DPCCH is on the l channel) may be described by Expression (1):

$$y_l(n) = h_l(n)A(b) + v_l(n); n = 1, 2, \ldots, N = 10. \quad (1)$$

In Expression (1), b=+1 implies an ACK bit, b=−1 implies a NACK bit and b=0 implies a DTX frame. Thus, Expression (2) defines the amplitude, A(b), as a function of the transmitted bit b as:

$$A(b) = \begin{cases} \sqrt{P_A G_{hs}} & \text{if } ACK \text{ bit}, b = 1 \\ 0 & \text{if } DTX \text{ bit}, b = 0 \\ \sqrt{P_N G_{hs}} & \text{if } NACK \text{ bit}, b = -1 \end{cases} \quad (2)$$

In Expression (2), $G_{hs}$ is the spreading factor of HS-DPCCH channel.

De-spread interference plus noise may be represented by $v_l(n) \sim CN(0, \sigma_l^2)$, where $\sigma_l^2 \approx G_{hs} I_o \forall l$. Here $I_o$ is the total received interference and CN(x, y) refers to complex-valued Gaussian noise with mean x and variance y. After channel de-rotation, a detection metric z(n) may be determined, as provided in Expression (3):

$$z(n) = \mathcal{R}\left\{\sum_{l=1}^{L} \hat{h}_l^*(n) y_l(n)\right\}; n = 1, 2, \ldots, N = 10 \quad (3)$$

Channel estimates $\hat{h}_l(n)$ may be a one-shot estimate, or may be an interpolated channel estimate or a Wiener filter-based estimate for the $l^{th}$ finger. In an effort to make ACK/NACK decisions available as early as possible to the NodeB scheduler, the channel estimate may be assumed to be causal. The channel estimate may also be non-causal, such as a look-ahead smoothed estimate, at the expense of additional processing delay.

There are three possible detection hypotheses: ACK, NACK or DTX. The following describes a generic detection statistic for detecting whether a ACK bit, NACK bit or DTX frame (silence) was transmitted, based on a conventional WG4 detection routine, so as to provide context for the exemplary embodiments of the present invention.

Decision Statistic

A decision statistic, 'z', which may be referred to as a final accumulated detection metric, is a statistic which may enable detection of one of an ACK bit, NACK bit or DTX frame at the NodeB, based on all the information the NodeB receiver knows about the signal transmitted in the uplink from the UE, such as the signaling information transmitted on the HS-DPCCH channel in the uplink. The final accumulated detection metric (z) may be given by the coherent average of the N samples of the received signal z(n) and may be given by Expression (4):

$$z = \frac{1}{N} \sum_{n=1}^{N} z(n) \quad (4)$$

$$= \mathcal{R}\left\{\frac{1}{N}\sum_{n=1}^{N}\sum_{l=1}^{L} \hat{h}_l^*(n) h_l(n)\right\} A(b) + \mathcal{R}\left\{\frac{1}{N}\sum_{n=1}^{N}\sum_{l=1}^{L} \hat{h}_l^*(n) v_l(n)\right\}$$

$$= \begin{cases} \hat{A}_{Ack} + \varepsilon & \text{if } ACK \text{ bit is transmitted}, b = +1 \\ -\hat{A}_{Nack} + \varepsilon & \text{if } NACK \text{ bit is transmitted}, b = -1 \\ \varepsilon & \text{if there is no transmission}, b = 0 \end{cases}$$

where $$A_{Ack/Nack} = \sqrt{P_{A/N}}\, G_{hs}\, \mathcal{R}\left\{\sum_{l=1}^{L}\sum_{n=1}^{N} \hat{h}_l^*(n) h_l(n)\right\} / N. \text{ Further,}$$

$$E[\varepsilon^2] = \sigma^2$$

$$= G_{hs}(I_o/2) \sum_{l=1}^{L}\sum_{n=1}^{N} |\hat{h}_l(n)|^2 / N^2$$

Here, $A_{Ack}$, $A_{Nack}$ represent the received amplitudes corresponding to the transmission of an ACK bit or a NACK bit, respectively. The noise $\varepsilon$ is additive Gaussian noise with a variance equal to $\sigma^2$. The equation shows that the decision statistic based on the received signal may be expressed as an amplitude with additive noise. Thus, a generic detector for this above additive noise model of Expression (4) may be a threshold-based detector of the form shown in the equations of Expression (5).

Declare ACK iff $z > \tau_A$; or

Declare NACK iff $z < -\tau_N$;

Declare DTX else. (5)

Accordingly, the design of the detector may be influenced by the derivation of the two thresholds for ACK/NACK detection at the NodeB: $\tau_A$ (threshold for detection of ACK bit in the uplink signaling message) and $\tau_N$ (threshold for detection of NACK bit in the uplink signaling message), based on certain meaningful criteria.

Conventional WG4 Detection

Minimum performance requirements for the ACK/NACK detectors developed by different equipment manufacturers are specified in Working Group 4 (WG4) of the Third Generation Partnership Project (3GPP), the standards body for UMTS. Detection performance metrics of interest in the WG4 performance comparison are:

I. Conditional FALSE ALARM Type 1 Event: Conditional probability of DTX→ACK false alarm: Probability [ACK Detected given that DTX Transmitted]=$10^{-2}$. A conditional type 1 false alarm event may represent an event when the ACK/NACK detector declares the bit as ACK when in reality, a DTX bit was transmitted. WG4 chooses the threshold computation based on this requirement II. Conditional FALSE ALARM Type 2 Event: Conditional probability of NACK→ACK error–Probability[ACK Detected given that NACK Transmitted]=$10^{-4}$. A conditional type 2 false alarm event may represent an event when the ACK/NACK detector declares the bit as ACK when in reality, a NACK bit was transmitted. For WG4, this is a requirement that should be met for all scenarios as closely as possible.

III. Conditional MISS Event: Conditional probability of ACK Miss-Detection-Probability[NACK or DTX Detected given that ACK Transmitted]=$10^{-2}$. A conditional miss event may represent an event when the ACK/NACK detector declares the bit as either a NACK or DTX when in reality, an ACK bit was transmitted.

Accordingly, the detector specified in WG4 may be given by Expression (6).

$$\frac{|z|^2}{\hat{\sigma}^2} < 2N\tau_{wg4} \Rightarrow DTX \qquad (6)$$

Else, if $z > 0 \Rightarrow ACK$, otherwise $NACK$.

The WG4 detector described by Expression (6) first constructs a measure of the signal-to-noise ratio, given as the ratio of the absolute value squared of the decision statistic z and the estimated noise variance. If this ratio is less than the threshold $2N\tau_{wg4}$ then a DTX is declared. Otherwise, the sign of z is checked—if it is positive, then an ACK is declared; otherwise, a NACK is declared.

In order to compute the threshold $\tau_{wg4}$, the case when a DTX frame is being transmitted should be considered (i.e., when nothing is sent). The WG4 methodology is to set $\tau_{wg4}$ such that the conditional probability of false alarm (the probability of the event when the detector declares an ACK given that a DTX is transmitted) is set to some target probability of false alarm $p_0$. Thus, the probability of DTX being detected as ACK or NACK is $2 p_0$. This constraint is referred to the classical Neyman-Pearson detection constraint corresponding to the false alarm. The threshold $\tau_{wg4}$ may be computed by Expression (7) below:

$$2p_0 = Pr[|z|^2/\hat{\sigma}^2 > 2N\tau_{wg4} \mid DTX \text{ Transmitted}] \qquad (7)$$
$$= Pr[|\varepsilon|^2/\sigma^2 > 2N\hat{\sigma}^2 \tau_{wg4}/\sigma^2]$$
$$= erfc\left(\sqrt{N\tau_{wg4}\hat{\sigma}^2/\sigma^2}\right)$$
$$\tau_{wg4} = \left(\frac{\sigma^2}{\hat{\sigma}^2}\right)\frac{[erfc^{-1}(2p_0)]^2}{N}$$

where $$erfc(x) = 2/\sqrt{\pi} \int_x^\infty \exp(-t^2) dt.$$

If perfect estimation (or knowledge) of interference probability distribution is assumed and its statistics (i.e., that the noise is truly Gaussian and the estimate of the interference variance is exactly equal to the true interference variance ($\hat{\sigma}^2 = \tau^2$) then the $\tau_{wg4}$ threshold in Expression (7) may be computed offline (i.e., not in real time) for any given value of $p_0$. In WG4, the choice of $p_0$ is $10^{-2}$. However, simulations by the inventors, in at least one example, have indicated that for satisfactory performance of all the other performance metrics, a $p_0$ of $10^{-3}$ should be chosen, although other values may be selected depending on the desired applications and/or metric performance, as is evident to one having ordinary skill in the art. A $p_0=10^{-3}$ may lead to a threshold value $\tau_{wg4}=-3.8$ db. Expression (7) with the –3.8 db value of $\tau_{wg4}$ may henceforth be referred to as the WG4 detector.

A generic WG4 detection methodology having been described, the exemplary embodiments of the present invention are directed to methods of detecting signaling information in a wireless communication system. The classical non-Bayesian based detector developed by WG4 has been benchmarked for performance in the UMTS standards. However, the exemplary methodologies described hereafter represent a new framework for Bayesian detection. This detection framework, in the context of ACK/NACK detection, may be referred to as the Constrained Packet Loss (CPL) detector. Generally, the CPL detector criterion may be understood as a generalization of the Neyman-Pearson criterion in a Bayesian detection framework.

The detection methodologies described hereafter may be motivated by the following two principles: (1) the actual performance of the wireless communication system may be measured by the overall probability of false alarm ($P_{FA}$) and the overall probability of miss ($P_M$), and not based on merely conditional probabilities. The conditional probability measures are used in the classical approaches without regard to the a priori distribution of the transmitter (i.e., user that is generating ACK/NACK signaling information). Secondly, in many applications, such as ACK/NACK detection, constraining the overall probability of false alarm to a substantially low value may be desirable, even if it comes at the cost of a slightly higher probability of miss.

In classical detection theory, where the underlying transmission signals were assumed to be deterministic sources rather than probabilistic sources, the likelihood ratio test along with the Neyman-Pearson criteria have been widely adopted as detection metrics. However, all of Bayesian detection and estimation addresses the case when the sources are probabilistic in nature, thus requiring knowledge of the a priori probabilities of the transmitted signals. The WG4 detector is agnostic as to the actual a priori probability distributions of the source.

In the following example, a binary problem of detecting x=0 versus x=1 is considered by observing z, the final accumulated detection metric (i.e., decision statistic). The conventional definition of probability of false alarm ($P_{FA}$), probability of miss ($P_M$) and correct detection ($P_D$) are given by Expression (8) below.

$$P_{FA}^c = Pr[z \in \Gamma^1 | x=0]$$

$$P_M^c = Pr[z \in \Gamma^0 | x=1]$$

$$P_D^c = Pr[z \in \Gamma^1 | x=1] = 1 - P_M^c \quad (8)$$

Here, $\Gamma^1$ is the region of values such that the detector declares that $\hat{x}(z)=1$ if z lies in the region $\Gamma^1$. Similarly, $\Gamma^0$ is the region where the detector declares $\hat{x}(z)=0$.

However, the actual probability of false alarm may be given by the joint event of $x=0$ being transmitted and $\hat{x}(z)=1$ being detected. Similarly, the actual probability of miss may be given by the joint event of $x=1$ being transmitted and $\hat{x}(z)=0$ being detected. If the a priori probability of z is $\pi_0 = Pr[x=0]$ and or, $\pi_1 = Pr[x=1]$, when the sources are modeled as probabilistic, the probability of false alarm and the probability of miss may be defined by Expression (9), below.

$$P_{FA} = Pr[z \in \Gamma^1, x=0] = P_{FA}^c \pi_0$$

$$P_M = Pr[z \in \Gamma^0, x=1] = P_M^c \pi_0$$

$$P_D = Pr[z \in \Gamma^0, x=1] = P_D^c \pi_1 = \pi_1 - P_M \quad (9)$$

To constrain the probability of false alarm to a given low value, and in an effort to simultaneously attempt to reduce and/or minimize the probability of miss (or maximize the probability of detection), the typical formulations of the well-known maximum a posteriori (MAP) detection, or well known techniques for minimizing expected risk detection within the Bayesian framework, are not desirable. The exemplary embodiments of the present invention are directed to methodologies that propose an extension to the Neyman-Pearson test to allow for cases when the transmitted signals are probabilistic. For example, a classical Neyman-Pearson test of size a may be denoted as one which reduces and/or minimizes the conditional probability of miss constrained on the conditional false alarm rate to be less than a. Accordingly, with this definition, we have the following rule or definition: a Bayesian Constrained False Alarm (BCFA) detection test of level a may be defined as the function:

$$\hat{x}(z) = \begin{cases} 1 & \text{if } z \in \Gamma^1 \\ 0 & \text{if } z \in \Gamma^0 = R \backslash \Gamma^1 \end{cases} \quad (10)$$

where $\Gamma^1$ is the solution to

Minimize $P_M = Pr[z \in R \backslash \Gamma^1, x=1]$ subject to: $P_{FA} = Pr[z \in \Gamma^1, x=0] \leq \alpha$ \quad (11)

If we define the decision function $$\hat{x}(z) = \begin{cases} 1 & \text{if } z \in \Gamma^1 = \{z : L_B(z) > T\} \\ 0 & \text{if } z \in \Gamma^0 = R \backslash \Gamma^1 \end{cases} \quad (12)$$

where $T$ is determined such that $$P_{FA} \equiv P_{FA}(\hat{x}) = \int_{\{z:L_B(z)>T\}} f(z, x=0) dy = \alpha$$

then, it follows that:

For any decision function $x'(z) \neq \hat{x}(z)$, if $P_{FA}(x') < \alpha$, then $P_M(x') > P_M(\hat{x})$.

In other words, expressions (10)-(12) illustrate that the detection problem may be formulated as one trying to constrain the actual false alarm probability to a specified target probability of false alarm that is less than or equal to α, while minimizing the actual probability of miss. The detector that achieves this objective is the one for which the threshold is chosen, such that the actual probability of false alarm is equal to α.

In order to design a credible Bayesian strategy to address the ACK/NACK problem, various errors that are possible and the costs associated with each type of error to the overall wireless communication system may be considered. In the following example, the UE is assumed to have been scheduled by the base station (NodeB) scheduler. The ACK/NACK detector at the NodeB is, in general, not exercised when a DTX is expected (e.g., where the UE is not scheduled). In the following errors described below, all of the errors correspond to a case where the user has, in fact, been scheduled by the NodeB scheduler. The various types of errors and/or effects on the overall performance may be considered as follows.

Error Event I

Detection of either a NACK transmission or a DTX transmission as an ACK by the NodeB scheduler leads to a false alarm. When this happens, the NodeB scheduler thinks that the UE's packet has been successfully decoded and stops its re-transmissions. This may lead to a packet loss at the MAC layer. Packet losses are handled by higher layer (OSI layers 3-7) re-transmissions where the delay is large, as compared to the HARQ delays, which are handled by physical and MAC layers. Thus, the false alarm probability should be kept substantially low across all error event I scenarios (such as less than $10^{-4}$).

Error Event II

Another type of error is when an ACK is transmitted by the UE and is detected either as a NACK or a DTX by the NodeB scheduler. In either case, the Node-B HARQ process will try and resend the packet the next time the UE gets scheduled. This is not resource intensive and may require an additional re-transmission. Thus, looser error requirements on this miss-detection probability may be possible in this error event scenario.

Error Event III

When an ACK is transmitted by the UE and gets detected as a DTX by the NodeB scheduler, this also may lead to HARQ re-transmission with the same packet being sent again by the NodeB, for which the UE can report as an ACK or NACK the next time it receives it. The UE handles the event of receiving a duplicate copy of the packet that it had NACKed before by combining coherently the received signals across the current transmission and at least one previous transmission. This error event is not of a serious nature.

Error Event IV

When a DTX is transmitted by the UE and a NACK is detected by the NodeB scheduler, it leads to transmission with new HARQ parameters. Even though the UE had missed decoding the previous packet, the UE can combine across all the transmissions (except the one it missed), so there would be no problem. Again, this depends on how this situation is handled at the UE; thus this error event is not an extremely critical error event.

The detection problem may be separated into two independent parts. One detection may consider error events I and II (false alarm and miss), and the other considers error events III and IV. The inventors have demonstrated that a BCFA test for the first case may reduce to comparing z against a threshold such as $\tau_A$ (the threshold for ACK bit detection in an uplink signaling message transmitted by the UE).

Determining Detection Threshold $\tau_N$

The detection of the NACK signal affects the error events III and IV and may reduce to comparing z against another threshold, which may be referred to as $\tau_N$ (the threshold for NACK bit detection in an uplink signaling message transmitted by the UE). Since $\tau_A$ determines the transitions of NACK or DTX into the ACK decision region, ($z > \tau_A$), and the transition of ACK into the NACK or DTX regions, ($z < \tau_A$). On the other hand, the transitions of DTX to NACK and vice/versa are governed by $\tau_N$ and are independent of the choice of $\tau_A$. Thus, since $\tau_N$ governs only error events III and IV, both of which are not critical, the WG4 detection criterion may be used as $\tau_N$. In other words, this criterion is described by Expression (13):

$$Pr[NACK \text{ detected} | DTX \text{ Transmitted}] = p_o \quad (13)$$
$$\tau_N : \Rightarrow \int_{z<\tau_N} f(z|D) dz = p_o$$

Expression (13) gives a threshold value as the negative of the WG4 threshold $\tau_{wg4}$ described in Expression (7).

Detecting Signaling Information Using a Detection Parameter

The choice of $\tau_A$, however, is more critical as to the error events. Accordingly, an exemplary methodology for applying the BNP test to determine the threshold for ACK detection, in terms of the probability of false alarm (error event I) may be given by Expression (14) for $P_{FA}$ below.

$$P_{FA} = PR[NACK \text{ or } DTX \text{ transmitted, } ACK \text{ detected}] \quad (14)$$
$$= P_{FA,D} + P_{FA,N}$$
$$= Pr[ACK \text{ detected} | DTX \text{ Transmitted}]\pi_D +$$
$$Pr[ACK \text{ Detected} | NACK \text{ Transmitted}]\pi_N$$
$$= \int_{z>\tau_a} f(z|D)\pi_D dz + \int_{z>\tau_A} f(z|N)\pi_N$$

where $P_{FA,D}$ and $P_{FA,N}$ are the probabilities of false alarm corresponding to a DTX and a NACK transmission, respectively. In Expression (14), the term $\pi_N$ represents the a priori probability of the ACK/NACK detector at the NodeB detecting a NACK bit in an uplink signaling message transmitted by a given UE, and $\pi_D$ represents the a priori probability of the ACK/NACK detector detecting a DTX frame in the uplink signaling message transmitted by the UE.

The probability of ACK miss-detection ($P_M$) may thus be given by Expression (15):

$$P_M = Pr[ACK \text{ transmitted, } NACK \text{ or } DTX \text{ detected}] \quad (15)$$
$$= Pr[NACK \text{ or } DTX \text{ detected} | ACK \text{ transmitted}]\pi_A$$
$$= \int_{z<\tau_A} f(z|A)\pi_A dz$$
$$= \left(1 - \frac{1}{2} erfc\left(\frac{\tau - A_{Ack}}{\sqrt{2\sigma^2}}\right)\right)\pi_A$$

In Expression (15), $A_{Ack}$ represents the received amplitude corresponding to the transmission of an ACK bit, $\tau$ is any given threshold for ACK detection, $\sigma^2$ represents the variance in the Gaussian noise present in the received signal, and the term $\pi_A$ represents the a priori probability of the UE transmitting an ACK signal. Thus, Expression (15) illustrates that $P_M$ may be determined as a function of the detection threshold, the received signal parameters and the transmission probability. The constraint on the false alarm may give rise to the following Expression (16), to be solved for a detecting parameter $\tau$, which may result in a determination of a detection parameter such as the ACK threshold $\tau_A$:

$$P_{FA} = \frac{1}{\sqrt{2\pi\sigma^2}} \int_{z>T_A} \exp\left(-\frac{z^2}{2\sigma^2}\right)\pi_D dz + \quad (16)$$
$$\frac{1}{\sqrt{2\pi\sigma^2}} \int_{z>T_A} \exp\left(-\frac{(z-A_{Nack})^2}{2\sigma^2}\right)\pi_N dz = p_{pl}$$
$$= \frac{1}{2} erfc\left(\frac{\tau + A_{Ack}}{\sqrt{2\sigma^2}}\right)\pi_N + \frac{1}{2} erfc\left(\frac{\tau}{\sqrt{2\sigma^2}}\right)\pi_D = p_{pl}$$

In Expression (16), $p_{pl}$ is the target probability of packet loss (i.e., target probability of false alarm), also referred to as the packet loss constraint, and $A_{Nack}$ represents the received amplitude corresponding to the transmission of a NACK bit. The solution to Expression (16) may be obtained iteratively or numerically. Thus the threshold for detection of an ACK bit in signaling information of a signal received from the user may be a function of measurable or determinable parameters such as the thresholds for NACK and DTX detection, the decision statistic z, the variance in Gaussian noise and the amplitudes corresponding to the transmitted ACK and/or NACK bit, for example. For the sake of simplicity, the inventors have developed an approximate solution to this problem using the following inequality:

$$\text{If max}\{P_{FA,N}, P_{FA,D}\} = p_{pl}/2, \text{ then } P_{FA} \leq p_{pl} \quad (17)$$

With this upper bounding, the constrained packet loss (CPL) detector may be approximated as shown by the thresholds for detecting an ACK bit in signaling information transmitted by a UE, defined in Expression (18).

$$\text{Define } \tau_{A,N} = \sqrt{2\sigma^2} \, erfc^{-1}\left(\frac{0.5 p_{pl}}{\pi_N}\right) - A_{Nack} \text{ and} \quad (18)$$
$$\tau_{A,D} = \sqrt{2\sigma^2} \, erfc^{-1}\left(\frac{0.5 p_{pl}}{\pi_D}\right) \text{ then}$$
$$\tau_A = \max\{\tau_{A,N}, \tau_{A,D}\}$$

Expression (18) results in a packet error probability of less than $p_{pl}$. Typically, $p_{pl}$ may be set to $10^{-4}$. Accordingly, the threshold $\tau_A$ may be determined as a function of one or more of the variance in the Gaussian noise present (which influences the operating signal to noise ratio), the a priori probabilities of NACK and DTX transmission ($\pi_N$ and $\pi_D$) and the target packet error probability $p_{pl}$.

The WG4 detector used the classical Neyman-Pearson criteria for only the conditional probability of the transitions of DTX to ACK. In that case, it is possible that $P_{FA}$ as defined in Expression (16) is greater than $10^{-4}$. If, e.g., the a priori (i.e., prior) probability of NACK, $\pi_N$, is substantially small (such as $10^{-2}$) and the a priori probability of DTX, $\pi_D$ is significant, then the $P_{FA}$ may be dominated by the term Pr[ACK Detected|DTX Transmitted]$\pi_D$, which can be much greater than $10^{-4}$, if the Pr[ACK Detected|DTX Transmitted] is only $10^{-2}$, as required by the WG4 specifications.

On the other hand, the WG4 algorithm could also result in a substantially small true false alarm probability if the prior probability of DTX is substantially small (such as $10^{-3}$). In that case, the design may be over-conservative, and the performance, in terms of probability of miss, may suffer. Therefore, the false alarm performance of the WG4 detector may be highly sensitive to the a priori probabilities of NACK and DTX, as well as to the operating signal-to-noise ratio.

The CPL detector, on the other hand, may ensure that the true probability of false alarm is kept constant at the target probability value, irrespective of the operating signal-to-noise ratio and the a priori probabilities of NACK and DTX transmission. This detector results in the best possible detection performance in terms of probability of miss, constrained upon the false alarm constraint.

Detection Signaling Information Using Estimating Transmission Probabilities

Another exemplary embodiment of the present invention is directed to a method for detecting signaling information using an estimated probability of transmitted signal information that is transmitted in a signal received from a user (i.e., estimated probability of transmission). For example, the a priori transmission probabilities may be one of an a priori probability of an ACK bit (ACK transmission), a NACK bit (NACK transmission) or a DTX frame (DTX transmission) for each user in a wireless communication system.

In the above Bayesian schemes, the assumption was that the a priori probabilities are known at the receiver (i.e., NodeB receiver). This entails whether the operator knows the current the HS-DPCCH ACK/NACK slot that corresponds to a scheduled transmission to the UE, or not. The prior (a priori) probability of DTX during a scheduled transmission time interval (TTI=2 msec) may depend on the power control set point for controlling transmit power at which the HS-SCCH carrying the scheduling information is transmitted. If the probability of miss-detection of the HS-SCCH, $p_{scch\text{-}miss}$, is known, and a good measure of the targeted block error rate $p_{tar}$ is known for a particular re-transmission, the probability of ACK detection and probability of NACK detection ($P_{ACK}$ and $P_{NACK}$) may be obtainable in the case where the UE is scheduled. In this case, $$\pi_A = (1-p_{tar})(1-p_{scch\text{-}miss}),\ \pi_N = (1-scch\text{-}miss)\text{ and}$$
$$\pi_D = p_{scch\text{-}miss}. \tag{19}$$

An estimate of $p_{tar}$ may depend on which re-transmission is under consideration, and the accumulated information from previous HARQ transmission(s) and the predicted channel quality indicator (CQI) value for the current transmission may also be taken into account. However, due to delays in receiving the CQI and the variability in the true error rate of the HS-SCCH, it may not be possible to know the probabilities $p_{tar}$ and $p_{scch\text{-}miss}$ with great accuracy. Further, the limited signaling interactions between the Node-B transmitter and the Node-B receiver may make it impossible to know these probabilities. As a result, it may be desirable to be able to estimate the a priori probabilities online (i.e., in essentially real-time or dynamically at the NodeB receiver). Accordingly, the methodology described hereafter may provide a mechanism to dynamically estimate these probabilities.

In general, and as an example, consider the detection problem of detecting x=A where the estimation of $\pi_A$=Pr[x=A], where it is known that $\pi_A$=E[Pr[x=A|z]], where A represents an ACK having been transmitted by the UE to the NodeB receiver.

Based on $\pi_A$=E[Pr[x=A|z]], a relatively simple adaptive algorithm may be proposed as follows: if the current estimate of $\pi_A$ was $\hat{\pi}_A(t)$, then the a posteriori probability may be computed based on the observation of z=z(t), where t is the TTI instant. That is, $\hat{P}[(x=A|z(t);)\hat{\pi}_A(t)]$ may be computed in accordance with Expression (20) below.

$$\hat{P}[(x=A\mid z(t);)\hat{\pi}_A(t)] = \frac{f(z(t)\mid x=A)\hat{\pi}_A(t))}{(f(z(t)\mid x=A)\hat{\pi}_A(t) + f(z(t)\mid x=N)\hat{\pi}_N(t) + f(z(t)\mid x=D)\hat{\pi}_D(t))} \tag{29}$$

The value from Expression (20) for the a posteriori probability of x=A may be utilized to update the estimate of the a priori probability of ACK transmission via an averaging process, as described in Expression (21).

$$\hat{\pi}_A(t+1) = \lambda_r \hat{\pi}_A(t) + (1-\lambda_r)\hat{P}[(x=A|z(t);\hat{\pi}_A(t))] \tag{21}$$

In essence, the exemplary methodology may convert an estimate of the a posteriori probability based on the current estimate of the a priori probability, $\hat{\pi}_A(t)$, into an updated estimate, $\hat{\pi}_A(t+1)$, of the a priori probability. Here $\lambda_r \in (0,1)$ may represent a (possibly) time-varying forgetting factor, which can be set by the Node-B receiver. Typically, $\lambda_r$ may be set to a constant value such as 0.99, for example. The iterations may start with some initial value of the probability estimate $\hat{\pi}_A(0) \in (0,1)$. Similarly, Expression (21) may be easily adapted to estimate the a priori probability of a NACK transmission, $\hat{\pi}_N(t+1)$, or of a DTX transmission, $\hat{\pi}_D(t+1)$, and as such, equations are not repeated here for reasons of brevity.

The application of the exemplary methodologies requires an understanding of the nature of the downlink Node-B scheduler, since the scheduler influences the generation of an ACK or a NACK at the UE. A scheduler algorithm at the NodeB may take advantage of time-diversity by planning for multiple re-transmissions for all users. Thus, larger packet sizes may be selected and may be potentially successfully transmitted in multiple re-transmissions, in order to improve spectral efficiency. Thus, in most cases, the probability of failure in the first transmission may high, and it may progressively decrease as the number of re-transmissions increase. From this observation, the a priori probability of NACK (failure of a packet) may be substantially dependent on the re-transmission index N.

On the other hand, the probability of SCCH missed detection, $p_{scch\text{-}miss}$, which is the a priori probability of generating a DTX even though the UE was scheduled, is not dependent on the re-transmission index. At the Node-B receiver, the next scheduled TTI after an ACK has been detected is known and is the first transmission of the next packet. The exemplary a priori estimation methodology described above may be implemented for estimating $\pi_N$ independently for each of the re-transmissions, such as up to a given number of re-transmissions, $N_{max}-1$, for example. The exemplary estimation methodologies may be run for a common update for any actual re-transmission that is greater than $N_{max}$. This way, the $N_{max}$ number of estimates are stored at the base station receiver for $\pi_N$ and $\pi_A$, and only one common estimate is kept for $\pi_D$, which is updated irrespective of the re-transmission index whenever the UE is scheduled.

EXAMPLES

Figure 1:
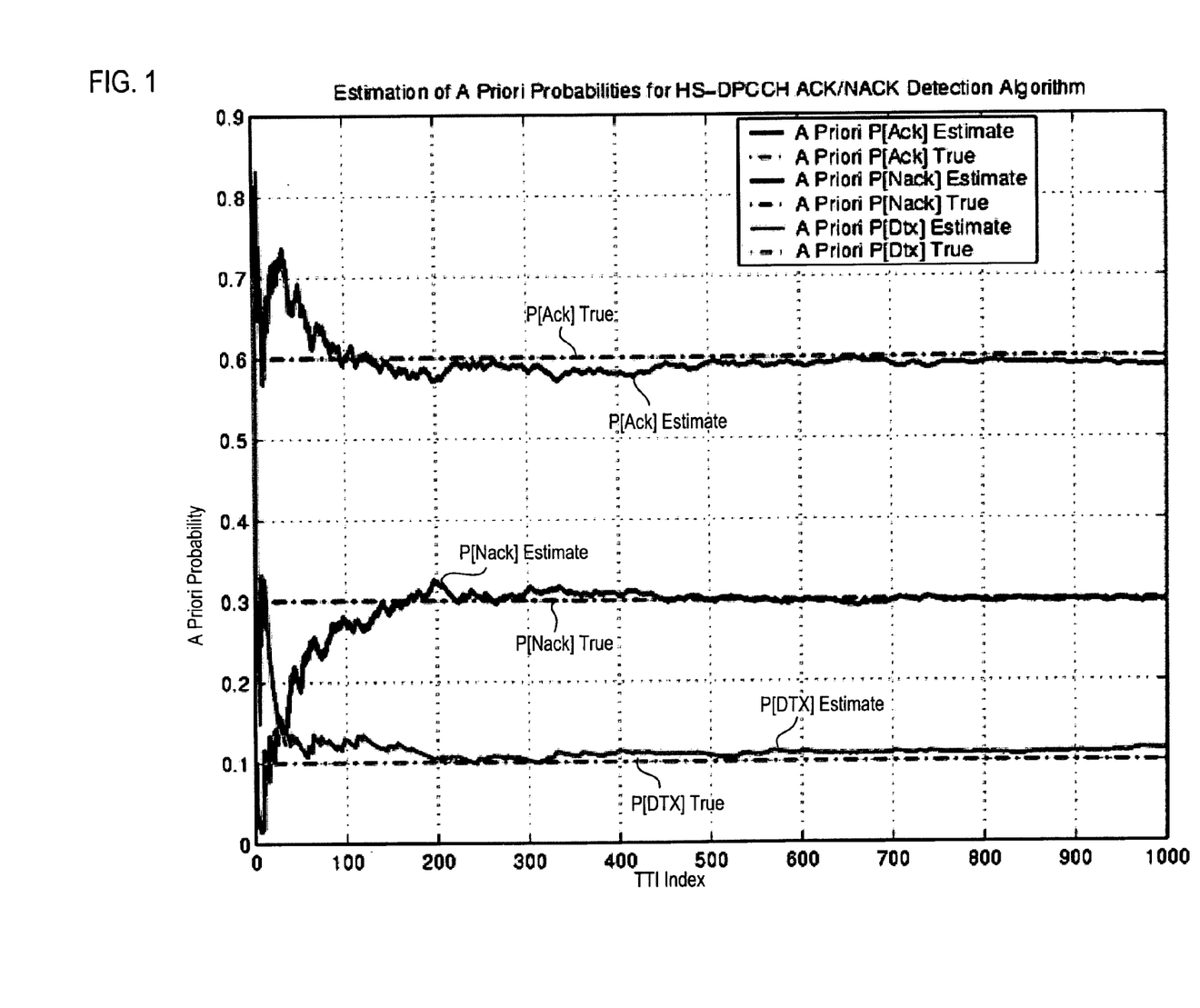
FIGS. 1 and 2 are graphs illustrate the convergence of the exemplary a priori probability estimation methodology for estimating the probability of transmitted signal in an AWGN channel and a Case 1 channel, respectively.
Figure 2:
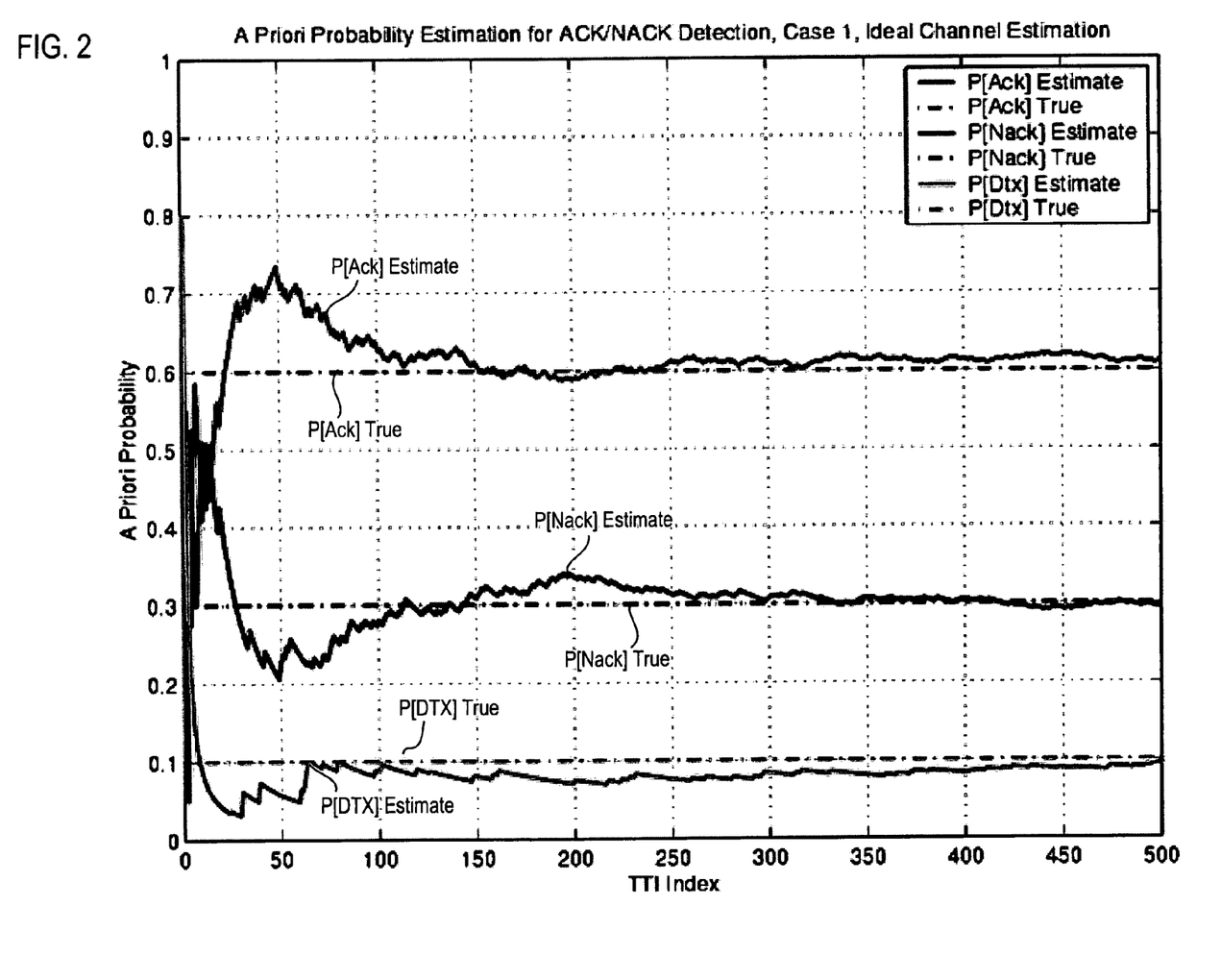

FIGS. 1 and 2 are graphs illustrate the convergence of the exemplary a priori probability estimation methodology for an AWGN channel and a Case 1 multipath channel, respectively. FIGS. 1 and 2 illustrate a priori probability as a function of TTI index. The true probabilities of ACK, NACK and DTX transmission were chosen as $\pi_A$=0.6, $\pi_N$=0.3 and $\pi_D$=0.1. The initial starting values were $\hat{\pi}_A(0)$=$\hat{\pi}_N(0)$=0.1 for the ACK and NACK probability estimates, and $\hat{\pi}_D(0)$=0.9 for the DTX estimate. In spite of choosing poor initial starting values for the inventive methodology, the inventors observed convergence at around 100 TTIs, as shown in each of FIGS. 1 and 2. The convergence in the Case 1 channel did a bit better due to the improved averaging provided by feeding channels.

Figure 3:
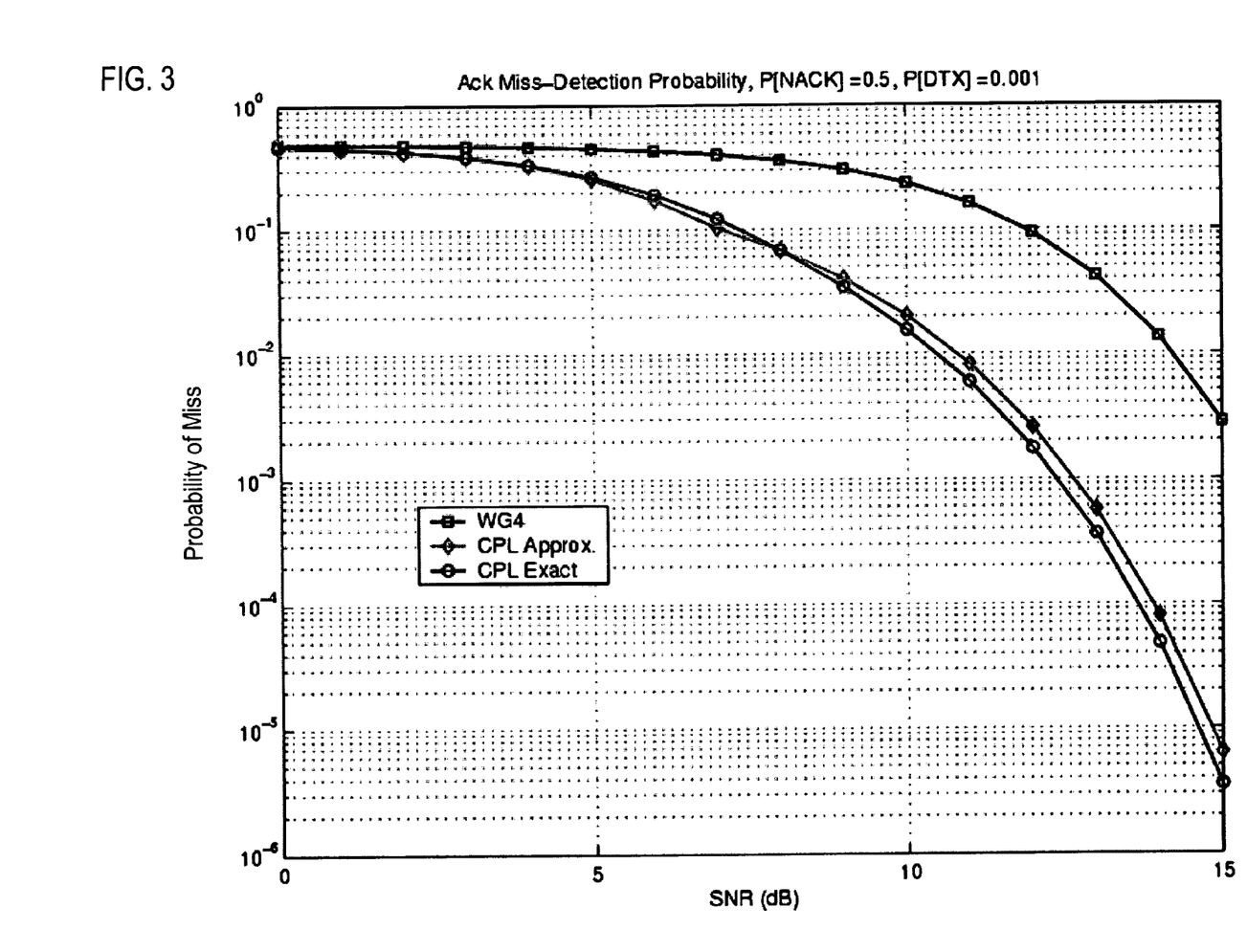
FIGS. 3 and 4 illustrate graphs of probability of miss and probability of false alarm performance to compare the performance of the exemplary estimation methodologies to a conventional detector, referred to as the WG4 detector.
Figure 4:
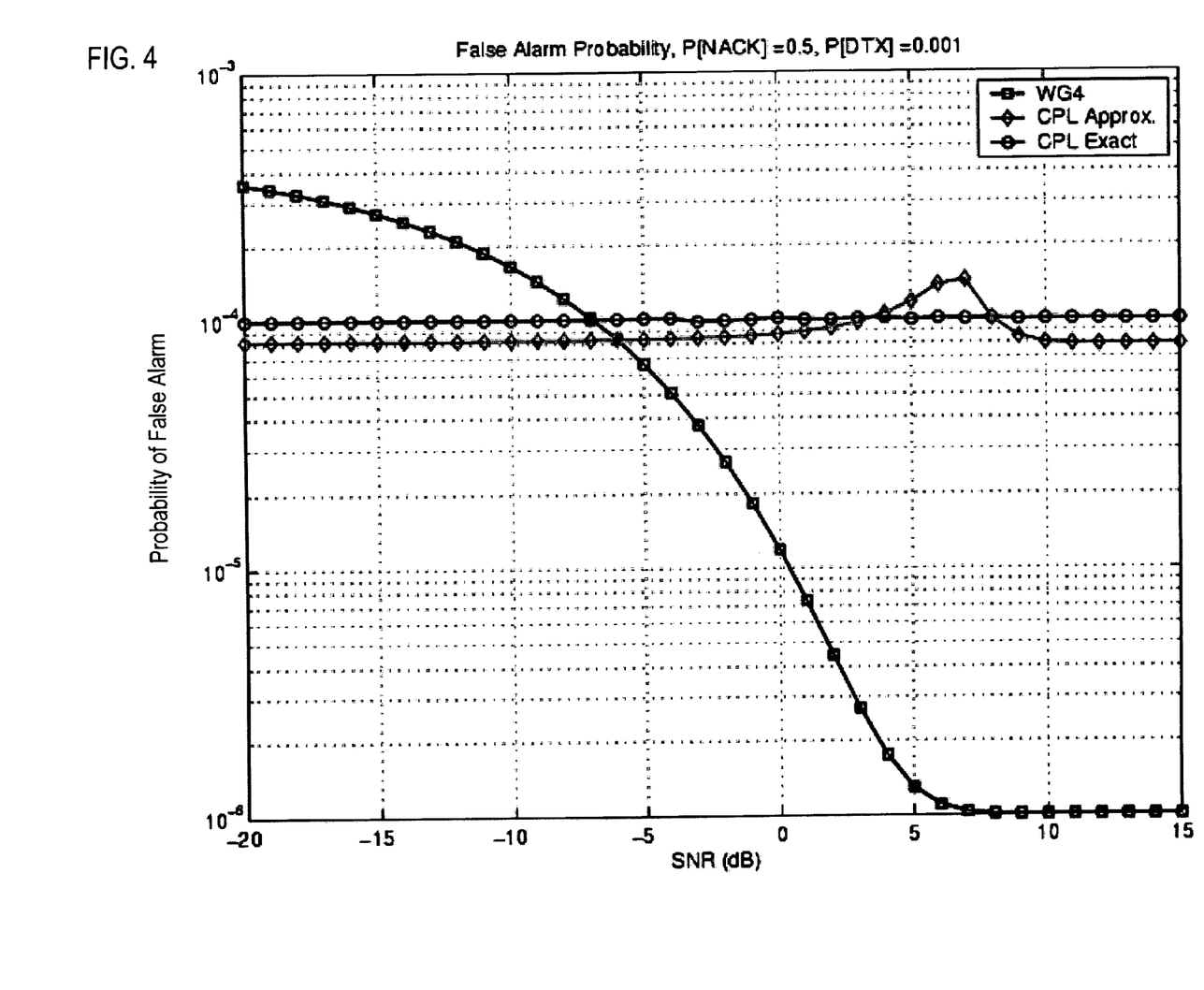

FIGS. 3 and 4 illustrate probability of miss and probability of false alarm performance to compare the performance of the exemplary estimation methodologies to the conventional WG4 detector for two different values of $\pi_D$ (0.001 and 0.1). The exemplary methodologies are labeled as 'CPL Approx' and 'CPL exact', in the graphs of FIGS. 3 and 4. Referring to the graphs in FIGS. 3 and 4, it may be shown that the CPL methodologies maintain a false alarm rate of $10^{-4}$ (FIG. 4), while giving much improved performance in miss detection (FIG. 3) as compared to the WG4 detector. The false alarm rate for WG4 is not controlled and goes from $10^{-2}$ to $10^{-6}$, depending on the operating SNR region.

When the a priori probability of DTX transmission is high (0.1), the miss detection performance of all the algorithms is essentially identical, but the CPL solutions maintain better (and constant) false alarm probability, as shown in FIG. 4. This may be expected, since for lower SNR ranges, the probability of NACK going to ACK is a dominating event, which is not controlled by the WG4 detector.

Figure 5:
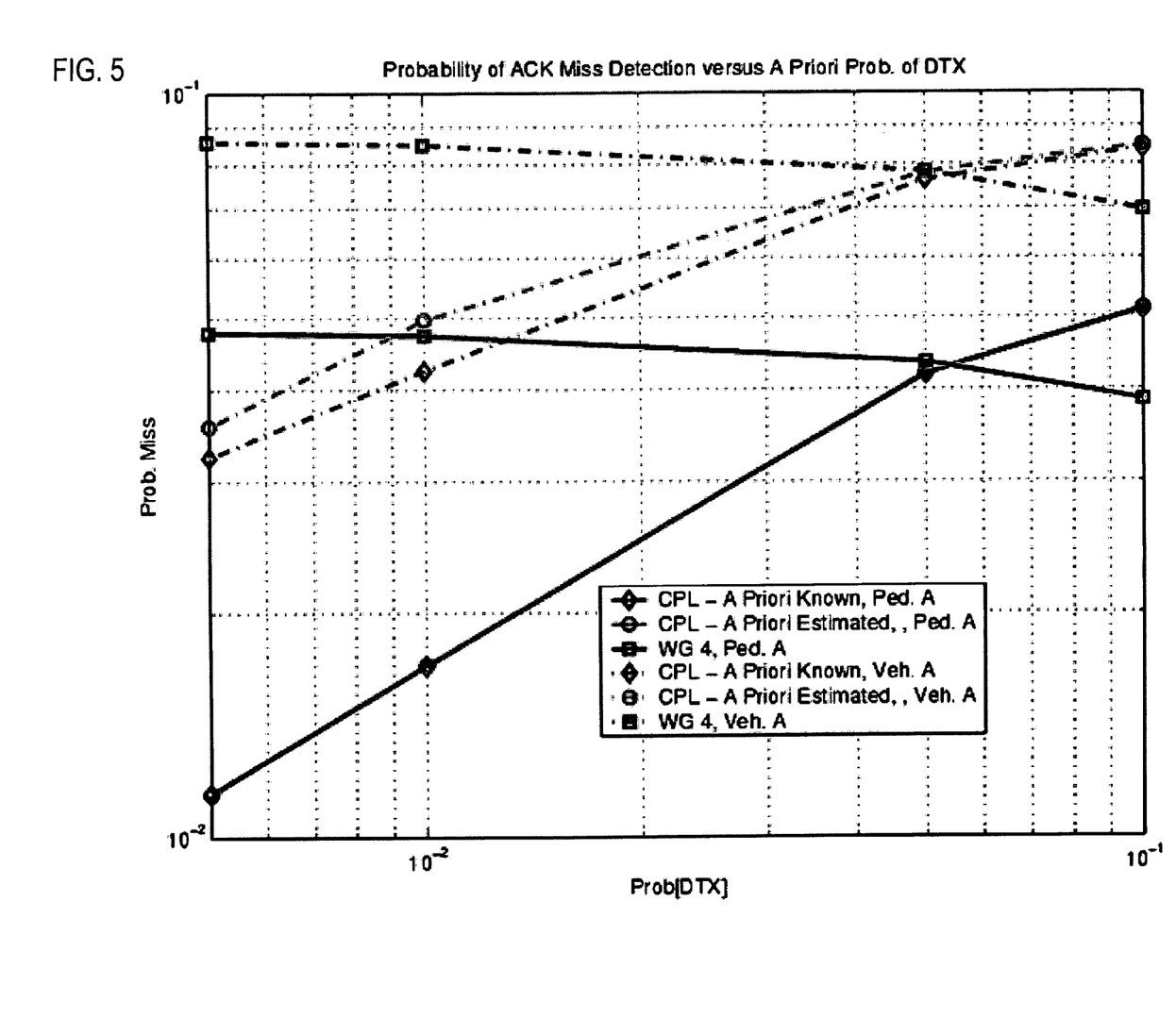
FIG. 5 is a graph to illustrate the performance of the detector in accordance with the exemplary embodiments as compared to the performance of a conventional WG4 detector.

FIG. 5 illustrates the performance of the exemplary (CPL) and WG4 detectors across different values of $\pi_D$ with inner and outer-loop power control (which tries to keep the DPDCH block error constant at $10^{-2}$). As shown in FIG. 5, the performance is not substantially sensitive to the different values of $\pi_N$ in the range of 0.9 to 0.1. Since the value of $\pi_D$ is variable in an actual situation, depending on the power control set point for the HS-SCCH, the results have been presented across different values of $\pi_D$.

The approximate CPL solutions had a false alarm set-point of $2\times10^{-4}$ and the a priori probabilities were estimated by the exemplary estimation methodologies described herein. The results for FIG. 5 are presented for the pedestrian A and vehicular A fading channel profiles, which consist of two fading channel profiles with multipaths, respectively. Referring to FIG. 5, the CPL solutions from the exemplary estimation methodologies were able to maintain a constant false alarm rate while exhibiting an improved miss detection performance, as compared to the WG4 detector.

The updated a priori probability estimates determined in accordance with Expression (21) may of course be used to refine the threshold calculations as shown in Expressions (16-18). For example, updated values for $\hat{\pi}_N(t+1)$ and/or $\hat{\pi}_D(t+1)$ may be used for (i.e., replace) $\pi_N$ and $\pi_D$ to refine the calculation for $\tau_A$ in Expression (18).

The exemplary embodiments of the present invention being thus described, it will be obvious that the same may be varied in many ways. Such variations are not to be regarded as a departure from the spirit and scope of the exemplary embodiments of the present invention, and all such modifications as would be obvious to one skilled in the art are intended to be included within the scope of the following claims.

What is claimed is:

1. A method of wireless communication, comprising:
receiving, at a network element, signaling information in a received signal; and
detecting, at the network element, the signaling information using a detection parameter that is determined based on an actual probability of false alarm and a target probability of false alarm, wherein
the detecting further includes determining the detection parameter used for signal detection from a maximum of a value of the detection parameter for ACK detection given a NACK transmission and a value of the detection parameter for ACK detection given a DTX transmission, where the value of the detection parameter for ACK detection given the NACK transmission and the value of the detection parameter for ACK detection given a DTX transmission are determined based on at least the target probability of false alarm.

2. The method of claim 1, wherein detecting includes solving an equation for the actual probability of false alarm so as to satisfy the target probability of false alarm in terms of the detection parameter.

3. The method of claim 2, wherein the actual probability of false alarm is a function of the probability of detecting an acknowledgment (ACK) bit when a negative acknowledgment (NACK) bit was transmitted in the signaling information of the received signal, and the probability of detecting an ACK bit when a discontinuous transmission (DTX) frame was transmitted in the signaling information of the received signal.

4. The method of claim 2, wherein the detection parameter for ACK detection given a NACK transmission is determined as a function of at least one of a variance in Gaussian noise present in the signal, an a priori probability of transmission of a NACK bit in the signaling information, the target probability of false alarm and an amplitude of the transmitted NACK bit.

5. The method of claim 2, wherein the detection parameter for ACK detection given a NACK transmission is determined as a function of at least one of a variance in Gaussian noise present in the received signal, an a priori probability of transmission of a DTX frame in the signaling information, and the target probability of false alarm.

6. The method of claim 1, wherein the detection parameter related to ACK detection given a NACK transmission is determined as a function of at least one of a variance in Gaussian noise present in a signal, an a priori probability of transmission of a NACK bit in a signaling information, the target probability of false alarm and an amplitude of the transmitted NACK bit.

7. The method of claim 1, wherein the detection parameter related to ACK detection given a NACK transmission is determined as a function of at least one of a variance in Gaussian noise present in a received signal, an a priori probability of transmission of a DTX frame in a signaling information, and the target probability of false alarm.

8. A base station, comprising:
a processor configured to detect signaling information in a received signal using a detection parameter that is determined based on an actual probability of false alarm and a target probability of false alarm, wherein
the processor is further configured to determine the detection parameter used for signal detection from a maximum of a value of the detection parameter for ACK detection given a NACK transmission and a value of the detection parameter for ACK detection given a DTX transmission, where the value of the detection parameter for ACK detection given the NACK transmission and the value of the detection parameter for ACK detection given a DTX transmission are determined based on at least the target probability of false alarm.

9. A method of wireless communication, comprising:
receiving, at a network element, signaling information in a received signal; and
detecting, at the network element, the signaling information using an estimated transmission probability value for a subsequent time instant that is determined based on an estimated transmission probability value for a current time instant, wherein the estimated probability value for the current time instant and the estimated probability value for the subsequent time instant are a priori probabilities related to one of a probability of ACK, NACK and DTX transmission by a user;
storing N updated estimated probabilities for ACK and NACK transmissions, where N is an integer corresponding to a re-transmission index of a given number of retransmissions of the signaling information; and
storing an updated estimated probability for discontinuous transmission (DTX).

10. The method of claim 9, wherein the estimated probability value for the current time instant and the estimated probability value for the subsequent time instant are a priori probabilities of transmission of signaling information by a user.

11. The method of claim 9, wherein the estimated probability value for the current time instant and the estimated probability value for the subsequent time instant are a priori probabilities of transmission of an acknowledgment (ACK) bit by a user.

12. The method of claim 9, wherein the estimated probability value for the current time instant and the estimated probability value for the subsequent time instant are a priori probabilities of transmission of a negative acknowledgment (NACK) bit by a user.

13. The method of claim 12, wherein the a priori probability of NACK transmission is dependent on a re-transmission index of a given number of retransmissions of the signaling information.

14. The method of claim 9, wherein the estimated probability value for the current time instant and the estimated probability value for the subsequent time instant are a priori probabilities of transmission of a discontinuous transmission (DTX) by a user.

15. A method of wireless communication, comprising:
receiving, at a network element, signaling information in a received signal: and
detecting, at the network element, the signaling information using a detection parameter determined from a priori probabilities of transmission values, wherein the a priori probabilities include a current estimated probability value and an estimated probability value for a subsequent time instant related to one of a probability of ACK, NACK and DTX transmission by a user;
storing N updated estimated probabilities for ACK and NACK transmissions, where N is an integer corresponding to a re-transmission index of a given number of retransmissions of the signaling information; and
storing an updated estimated probability for discontinuous transmission (DTX).

16. The method of claim 15, wherein the a priori probabilities of transmission values include an a priori probability of transmission of at least one of an ACK bit, a NACK bit and a DTX frame in the signaling information.

17. The method of claim 15, wherein the network element is a base station receiver.

18. The method of claim 9, wherein the network element is a base station receiver.

* * * * *